United States Patent
Yang et al.

(10) Patent No.: US 8,990,805 B2
(45) Date of Patent: Mar. 24, 2015

(54) METHOD OF DYNAMIC RESOURCE ALLOCATION FOR A VIRTUAL MACHINE CLUSTER

(75) Inventors: Chao-Tung Yang, Taichung (TW); Hsiang-Yao Cheng, New Taipei (TW); Kuan-Chieh Wang, Taichung (TW)

(73) Assignee: Tunghai University, Taichung (TW)

( * ) Notice: Subject to any disclaimer, the term of this patent is extended or adjusted under 35 U.S.C. 154(b) by 306 days.

(21) Appl. No.: 13/495,869

(22) Filed: Jun. 13, 2012

(65) Prior Publication Data

US 2013/0145364 A1 Jun. 6, 2013

(30) Foreign Application Priority Data

Dec. 1, 2011 (TW) .............................. 100144246 A

(51) Int. Cl.
*G06F 9/455* (2006.01)
*G06F 9/46* (2006.01)
*G06F 9/48* (2006.01)
*G06F 9/50* (2006.01)

(52) U.S. Cl.
CPC .......... *G06F 9/45558* (2013.01); *G06F 9/4856* (2013.01); *G06F 9/5077* (2013.01); *G06F 2009/4557* (2013.01)
USPC .............................................. 718/1; 718/105

(58) Field of Classification Search
CPC ............................. G06F 9/45533; G06F 9/505
See application file for complete search history.

(56) References Cited

PUBLICATIONS

G. Somani & S. Chaudhary,"Load Balancing in Xen Virtual Machine Monitor",Cotemporary Computing, vol. 95, S. Ranka et al. ed: Springer Berlin Heidelberg, 2010, pp. 62-70.
Chao-Tung Yang, Kuan-Chieh Wang, Hsiang-Yao Cheng, & Cheng-Ta Kuo, ". . . Green Management Algorithm for . . . Cloud Computing", CTHPC 2011, Jun. 2-3, 2011.
Chao-Tung Yang, Wei-Li Chou, Hsing-Yao Cheng & Cheng-Ta Kuo, ". . . Virtual Machines Reliability with . . . Fault Tolerance on Cloud", CTHPC 2011, Jun. 2-3, 2011.

*Primary Examiner* — Mengyao Zhe

(57) ABSTRACT

A method of dynamic resource allocation for a virtual machine cluster is to calculate the resource usage weight of the respective virtual machine, the resource usage weight of the respective physical machine, and the average resource usage weight of the physical machines, to pick the physical machine with the greatest resource usage weight as the migration source machine, to pick the physical machine with the least resource usage weight as the migration object machine, and to move the virtual machine in the migration source machine with the resource usage weight thereof being closest to the migration difference value to the migration object machine to achieve the effect of load balancing.

4 Claims, 2 Drawing Sheets

METHOD OF DYNAMIC RESOURCE ALLOCATION FOR A VIRTUAL MACHINE CLUSTER

CROSS-REFERENCE

A technical literature published by the inventors in the 13$^{th}$ IEEE International Workshop on Future Trends of Distributed Computing System (FTDCS 2011) held in Banff, Alberta, Canada during Sep. 2-4, 2011 entitled "Green Power Management with Dynamic Resource Allocation for Cloud Virtual Machines". Said literature is incorporated herein by reference.

BACKGROUND OF THE INVENTION

1. Field of the Invention

The present invention is related to a virtual machine cluster, and, more particularly, to a method of dynamic resource allocation for the virtual machine cluster.

2. Brief Description of the Related Art

Since the computer was available in the market, the human lives have been relying on the computer rapidly, and the application of computer has been becoming more popular in various living places such as families, offices, entertainments, markets, restaurants, transportation tools, and schools. Currently, the computer is one of necessities in our daily lives, and its importance is invaluable.

The software and hardware for the computer are developed ineffably along with unceasing progress of the digital technology. In the early times, the computer with single core processor, which was independently used everywhere, could provide services satisfying needs of most users. However, in order to meet more complicated works and required service speeds which were expected by the users, on the one hand, the application network was developed to connect multiple computers for the computer being capable of sharing the services and works so as to achieve the effect of service widely and speedily, and, on the other hand, the computer with multi-core processors was developed as a servo host to enhance the effect of service.

Recently, due to development of cloud technology, a network service system with gathering multiple servo hosts becomes a basic system framework of the cloud service; wherein, it is naturally needed that a single servo host executes more different incompatible application programs to avoid the servo host in a state of low usage rate. Under the circumstances, the virtual machine simulation software running on each of physical machines such as servo hosts is applied to logically divide the servo host into multiple virtual machines to achieve a purpose of sharing resources commonly, and it becomes the best cloud service system framework which not only offers more executable application programs to share the resources but also promotes the reliability of service of the servo host.

In order to balance loads of the multiple processor cores in the servo host, G. Somani and S. Chaudhary proposed a method, entitled "Load Balancing in Xen Virtual Machine Monitor" in Contemporary Computing, Vol. 95, S. Ranka, A. Banerjee, K. K. Biswas, S. Dua, P. Mishra, R. Moona, S.-H. Poon, and C.-L. Wang, Eds. ed: Springer Berlin Heidelberg, 2010, pp. 62-70 to solve the problem. However, the method is incapable of solving problems related to load unbalance of a virtual machine cluster consisting of the physical machines such as the servo hosts.

SUMMARY OF THE INVENTION

Accordingly, an object of the present invention is to provide a method of dynamic resource allocation for a virtual machine cluster to balance the load of the respective physical machine in the virtual machine cluster.

In order to achieve the preceding object, the method of dynamic resource allocation for a virtual machine cluster according to the present invention is suitable for allocating the loads of the virtual machine cluster dynamically, wherein the virtual machine cluster consists of a plurality of physical machines such as servo hosts with at least a virtual machine in each of the physical machines.

The method of dynamic resource allocation comprises following steps:

calculating a resource usage weight of the respective virtual machine, a resource usage weight of the respective physical machine, and an average resource usage weight of the physical machines;

processing following steps when any one of difference values between the resource usage weight of the respective physical machine and the average resource usage weight of the physical machines is greater than a default migration value:

finding out one of the physical machines with the greatest resource usage weight as a migration source machine;

finding out one of the physical machines with the least resource usage weight as a migration object machine;

calculating a migration difference value between the resource usage weight of the migration source machine and the average resource usage weight of the physical machines;

finding out one of the virtual machines in the migration source machine with the resource usage weight thereof being closest to the migration difference value as a migration virtual machine;

moving the migration virtual machine to the migration object machine.

Wherein the resource usage weight of the respective virtual machine, the resource usage weight of the respective physical machine, and the average resource usage weight of the physical machines are figured out based on resources of processors and memories in the respective physical machine being used.

Wherein the resource usage weight of the respective virtual machine, the resource usage weight of the respective physical machine, and the average resource usage weight of the physical machines are calculated with following equations:

$$VM_{jiRate} = (VM_{jiCPUuse} * VM_{jiRAMallocate}) / \Sigma_{i=1}^{n}(VM_{jiCPUuse} * VM_{jiRAMallocate})$$

$$HOST_{jRate} = \Sigma_{i=1}^{v} VM_{jiRate}$$

$$\alpha = 1/P$$

wherein, j represents a serial number assigned to each of the physical machines; i represents a serial number assigned to each of the virtual machines; P represents total numbers of the physical machines in the virtual machine cluster; n represents total numbers of the virtual machines in the virtual machine cluster; v represents total numbers of the virtual machines in each of the physical machines respectively; $VM_{jiRate}$ represents the resource usage rate of i virtual machine in j physical machine to act as aforementioned resource usage weight of the respective virtual machine, i.e., the percentage proportion of the resource usage of i virtual machine in j physical machine to the resource usage of the virtual machine cluster; $VM_{jiCPUuse}$ represents a load rate of the processor of i virtual machine in j physical machine; $VM_{jiRAMallocate}$ represents a allocated memory of i virtual machine in j physical machine; $HOST_{jRate}$ represents the resource usage rate of j physical machine to act as aforementioned resource usage weight of the respective physical machine, i.e., the sum of resource usage rate of the virtual machines in the j physical machine; α represents the average resource usage rate of the physical machines to act as aforementioned average resource usage weight of the physical machines.

As the forgoing, the method of dynamic resource allocation according to the present invention is capable of migrating the virtual machine in the physical machine with high load to the physical machine with low load such that the purpose of balancing the load of each of the physical machines in the virtual machine cluster can be reached substantively.

BRIEF DESCRIPTION OF THE DRAWINGS

The detail structure, the applied principle, the function and the effectiveness of the present invention can be more fully understood with reference to the following description and accompanying drawings in which.

DETAILED DESCRIPTION OF THE INVENTION

Figure 1:
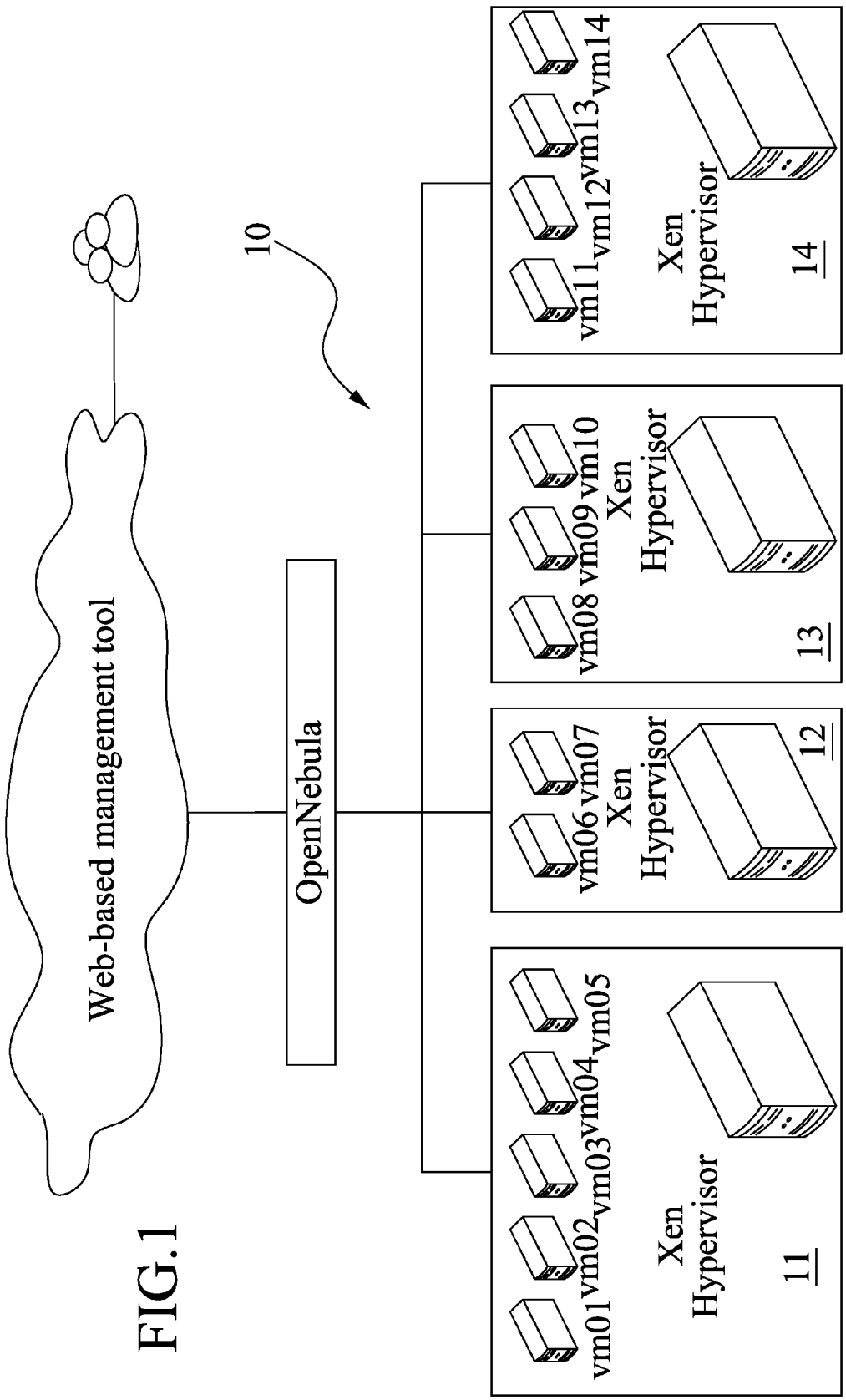
FIG. 1 is a diagram illustrating the system framework to implement the method of dynamic resource allocation for a virtual machine cluster according to the preferred embodiment of the present invention.

Referring to FIG. 1, the system framework to implement the method of dynamic resource allocation for a virtual machine cluster according to the preferred embodiment of the present invention is illustrated. The method of dynamic resource allocation of the present invention is a web-based management tool to allocate loads of a virtual machine cluster 10 dynamically.

Wherein, the virtual machine cluster 10 consists of multiple physical machines 11, 12, 13, 14 such as servo hosts; the physical machines 11, 12, 13, 14 each execute Xen Hypervisor software respectively to simulate one or more virtual machines vmxx; life migrations of the virtual machines vmxx are operated and managed by the OpenNebula software.

Figure 2:
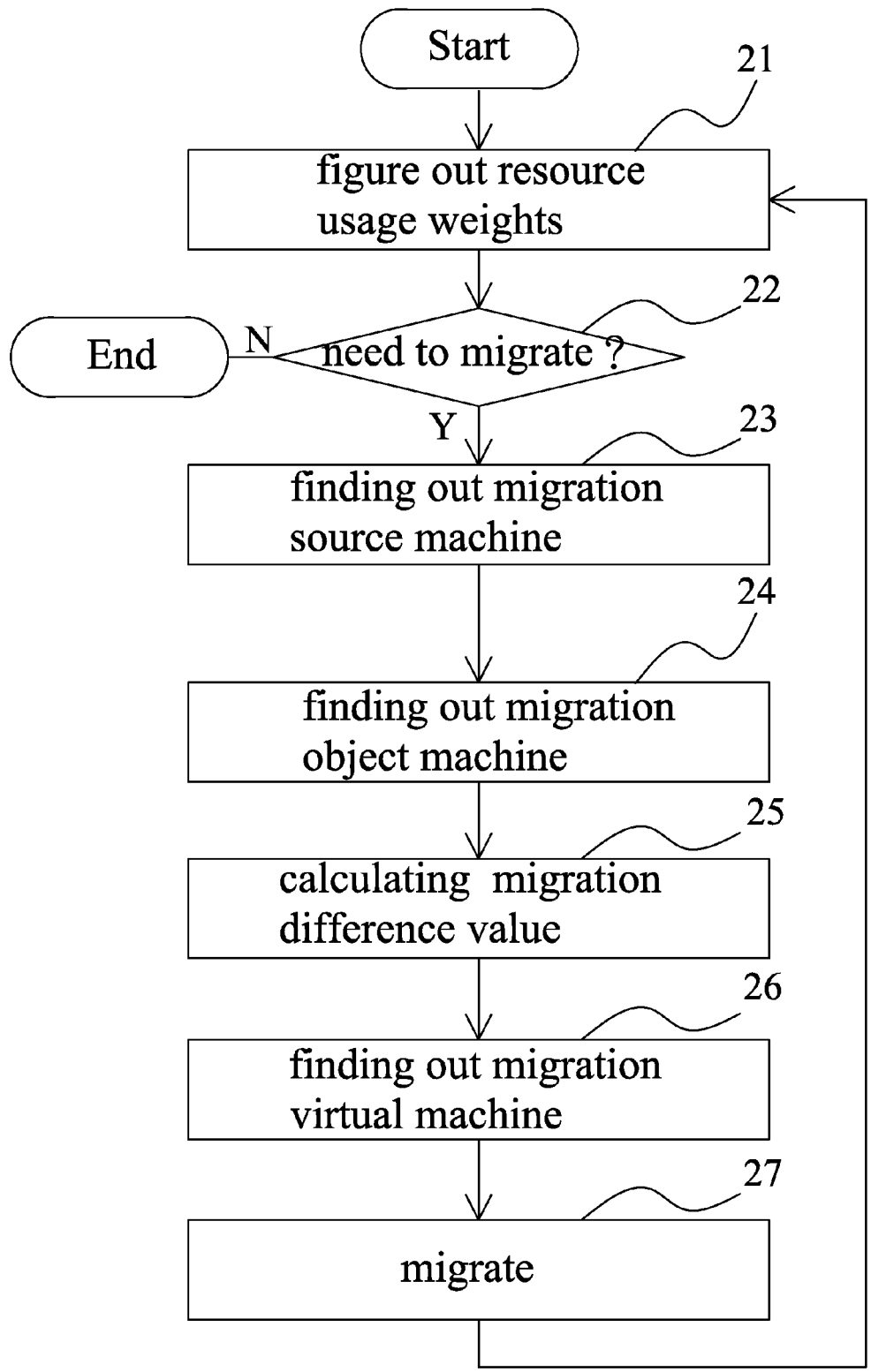
FIG. 2 is a flow chart illustrating steps of the method of dynamic resource allocation for a virtual machine cluster according to the preferred embodiment of the present invention.

Referring to FIG. 2, the flow chart shown in FIG. 2 illustrates steps of the method of dynamic resource allocation disclosed in the preferred embodiment of invention. Step 21 shown in FIG. 2 is to figure out resource usage weights of the virtual machines vmxx, resource usage weights of the physical machines 11, 12, 13, 14, and an average resource usage weight of the physical machines.

In the preferred embodiment, the respective resource usage weight of the virtual machines, the respective resource usage weight of the physical machines, and the average resource usage weight of the physical machines are figured out based on the resources such as the processors and memories in the physical machines 11, 12, 13, 14 being used by the physical machines 11, 12, 13, 14 or the virtual machines vmxx to obtain a resource usage rate of the respective virtual machine, a resource usage rate of the respective physical machine, and an average resource usage rate of the physical machines to act as the resource usage weight of the respective virtual machine, the resource usage weight of the respective physical machine, and the average resource usage weight of the physical machines. The preceding resource usage rates are calculated by following equations:

$$VM_{jiRate} = (VM_{jiCPUuse} * VM_{jiRAMallocate}) / \Sigma_{i=1}^{n} (VM_{jiCPUuse} * VM_{jiRAMallocate}) \quad (1)$$

$$HOST_{jRate} = \Sigma_{i=1}^{v} VM_{jiRate} \quad (2)$$

$$\alpha = 1/P \quad (3)$$

Wherein, j represents a serial number assigned to each of the physical machines 11, 12, 13, 14; i represents a serial number assigned to each of the virtual machines vmxx; P represents total numbers of the physical machines 11, 12, 13, 14 in the virtual machine cluster 10, i.e., 4; n represents total numbers of the virtual machines vmxx in the virtual machine cluster 10, i.e., 14; v represents total numbers of the virtual machines in each of the physical machines 11, 12, 13, 14, i.e., 5, 2, 3, and 4 respectively; $VM_{jiRate}$ represents the resource usage rate of i virtual machine in j physical machine; $VM_{jiCPUuse}$ represents load rate of the processor of i virtual machine in j physical machine; $VM_{jiRAMallocate}$ represents allocated memory of i virtual machine in j physical machine; $HOST_{jRate}$ represents the resource usage rate of j physical machine; α represents the average resource usage rate of the physical machines.

Although the load rate of the processor $VM_{jiCPUuse}$ and the allocated memory $VM_{jiRAMallocate}$ shown in the preceding equations are used to calculate in percentages to obtain the resource usage rate of the respective virtual machine $VM_{jiRate}$, the resource usage rate of the respective physical machine $HOST_{jRate}$, and the average resource usage rate of the physical machines α so as to act as the resource usage weight of the respective virtual machine, the resource usage weight of the respective physical machine, and the average resource usage weight of the physical machines. It is noted that persons who are skillful in the art know that other resources in the physical machines 11, 12, 13, 14 such as storage devices can be considered while the preceding weights are calculated or other different equations can be applied to calculate the weights.

After the resource usage weight of the respective virtual machine vmxx, the resource usage weight of the respective physical machine 11, 12, 13, 14, and the average resource usage weight of the physical machines are obtained, step 22 is processed to determine if it is necessary to migrate the virtual machines and to process the migration in steps 23~27 if a difference value between the resource usage weight of the respective physical machine 11, 12, 13, 14, and the average resource usage weight of the physical machines is higher than a default migration value σ.

In step 23, one of the physical machines 11, 12, 13, 14 with the greatest resource usage weight is picked as the migration source machine; in step 24, one of the physical machines 11, 12, 13, 14 with the least resource usage weight is picked as the migration object machine; in step 25, a migration difference value between the resource usage weight of the migration source machine and the average resource usage weight of the physical machines is figured out; in step 26, one of the virtual machines vmxx in the migration source machine with the resource usage weight thereof being closest to the migration difference value is picked as the migration virtual machine; in step 27, the migration virtual machine is moved to the migration object machine to complete a cycle of the resource allocation and ready for the next cycle of the resource allocation.

It is assumed that each of the physical machines 11, 12, 13, 14 shown in FIG. 1 is a servo host machine with 8 processor cores and a memory with 8129 Kbytes, then the available load rate of each of the physical machines 11, 12, 13, 14 is 8*100=800. In addition, the load rate of the processor $VM_{jiCPUuse}$ and the allocated memory $VM_{jiRAMallocate}$ of respective virtual machine vmxx in each of the physical machines 11, 12, 13, 14 are expressed in the following table after calculation with the equations (1) and (2) (the unit of the allocated memory $VM_{jiRAMallocate}$ is Kbytes):

| Physical Machine | Virtual Machine | $VM_{jiCPUuse}$ | $VM_{jiRAMallocate}$ | $VM_{jiRate}$ | $HOST_{jRate}$ |
|---|---|---|---|---|---|
| 11 | Vm01 | 95 | 512 | 0.08 | 0.45 |
|  | Vm02 | 100 | 1024 | 0.17 |  |
|  | Vm03 | 40 | 2048 | 0.14 |  |
|  | Vm04 | 10 | 512 | 0.01 |  |
|  | Vm05 | 30 | 1024 | 0.05 |  |
| 12 | Vm06 | 70 | 1024 | 0.12 | 0.17 |
|  | Vm07 | 60 | 512 | 0.05 |  |
| 13 | Vm08 | 10 | 1024 | 0.02 | 0.05 |
|  | Vm09 | 15 | 512 | 0.01 |  |
|  | Vm10 | 20 | 512 | 0.02 |  |
| 14 | Vm11 | 45 | 1024 | 0.08 | 0.33 |
|  | Vm12 | 60 | 512 | 0.05 |  |
|  | Vm13 | 30 | 512 | 0.03 |  |
|  | Vm14 | 100 | 1024 | 0.17 |  |

It is assumed that the default migration value $\sigma=0.05$, the average resource usage rate of the physical machines calculated in the equation (3) $\alpha=1/4=0.25$, and the four migration difference values ($HOST_{jRate}-\alpha$) are 0.20, −0.08, −0.20 and 0.08, respectively, wherein, there are two values greater than the default migration value $\sigma=0.05$ such that it is necessary to operate the migration; the resource usage rate $HOST_{jRate}$ of the physical machine 11 is 0.45 which is the greatest value, and the physical machine 11 is assigned as the migration source machine; the resource usage rate $HOST_{jRate}$ of the physical machine 13 is 0.05 which is the smallest value, and the physical machine 13 is assigned as the migration object machine. In addition, the resource usage rate $VM_{jiRate}$ of the virtual machine vm02 is 0.17 which is closest to the migration difference value 0.20 of the physical machine 11 such that the virtual machine vm02 is moved to the physical machine 13. The results after the migration being processed are shown in the following table:

| Physical Machine | Virtual Machine | $VM_{jiCPUuse}$ | $VM_{jiRAMallocate}$ | $VM_{jiRate}$ | $HOST_{jRate}$ |
|---|---|---|---|---|---|
| 11 | Vm01 | 95 | 512 | 0.08 | 0.28 |
|  | Vm03 | 40 | 2048 | 0.14 |  |
|  | Vm04 | 10 | 512 | 0.01 |  |
|  | Vm05 | 30 | 1024 | 0.05 |  |
| 12 | Vm06 | 70 | 1024 | 0.12 | 0.17 |
|  | Vm07 | 60 | 512 | 0.05 |  |
| 13 | Vm02 | 100 | 1024 | 0.17 | 0.22 |
|  | Vm08 | 10 | 1024 | 0.02 |  |
|  | Vm09 | 15 | 512 | 0.01 |  |
|  | Vm10 | 20 | 512 | 0.02 |  |
| 14 | Vm11 | 45 | 1024 | 0.08 | 0.33 |
|  | Vm12 | 60 | 512 | 0.05 |  |
|  | Vm13 | 30 | 512 | 0.03 |  |
|  | Vm14 | 100 | 1024 | 0.17 |  |

After the migration being processed once, the migration difference values ($HOST_{jRate}-\alpha$) are calculated again to obtain four values, 0.03, −0.08, −0.03 and 0.08; but one of the values is still greater than the default migration value $\sigma$ such that the migration has to be processed once more. The resource usage rate $HOST_{jRate}$ of physical machine 14 is 0.33, and it is the greatest resource usage rate $HOST_{jRate}$ among the four physical machines such that the physical machine 14 is assigned as the migration source machine; the resource usage rate $HOST_{jRate}$ of physical machine 12 is 0.17, and it is the least resource usage rate $HOST_{jRate}$ such that the physical machine 12 is assigned as the migration object machine. Besides, the resource usage rate $VM_{jiRate}$ of the virtual machine vm11 is 0.08 which is closest to the migration difference value 0.08 of the physical machine 14, and it is assigned as the migration virtual machine such that the virtual machine vm11 is moved to the physical machine 12. The migration difference values ($HOST_{jRate}-\alpha$) after the migration are 0.03, 0, −0.03, and 0, and it has achieved the effect of load balance.

While the invention has been described with referencing to a preferred embodiment thereof, it is to be understood that modifications or variations may be easily made without departing from the spirit of this invention, which is defined by the appended claims.

What is claimed is:

1. A method of dynamic resource allocation, which is suitable for allocating loads of a virtual machine cluster in which the cluster has a plurality of physical machines, and each of the physical machines at least has a virtual machine, comprising following steps:
   (a) calculating a resource usage weight of the respective virtual machine, a resource usage weight of the respective physical machine, and an average resource usage weight of the physical machines;
   (b) processing following steps when any one of difference values between said resource usage weight of the respective physical machines and said average resource usage weight of the physical machines is greater than a default migration value:
   (b1) assigning one of the physical machines with the greatest resource usage weight as a migration source machine;
   (b2) assigning one of the physical machines with the least resource usage weight as a migration object machine;
   (b3) calculating a migration difference value between the resource usage weight of the migration source machine and the average resource usage weight of the physical machines;
   (b4) assigning one of the virtual machines in the migration source machine with the resource usage weight thereof being closest to the migration difference value as a migration virtual machine;
   (b5) moving the migration virtual machine to the migration object machine;
   wherein the preceding steps are performed by a physical machine.

2. The method of dynamic resource allocation as defined in claim 1, wherein the resource usage weight of the respective virtual machine, the resource usage weight of the respective physical machine, and the average resource usage weight of the physical machines are figured out based on resources of processors and memories in the respective physical machine being used.

3. The method of dynamic resource allocation as defined in claim 2, wherein the resource usage weight of the respective virtual machine, the resource usage weight of the respective physical machine, and the average resource usage weight of the physical machines are calculated with following equations:

$$VM_{jiRate}=(VM_{jiCPUuse}*VM_{jiRAMallocate})/\Sigma_{i=1}^{n}(VM_{jiCPUuse}*VM_{jiRAMallocate})$$

$$HOST_{jRate}=\Sigma_{i=1}^{n}VM_{jiRate}$$

$$\alpha=1/P$$

wherein, j represents a serial number assigned to each of the physical machines; i represents a serial number assigned to each of the virtual machines; P represents total numbers of the physical machines in the virtual machine cluster; n represents total numbers of the virtual machines in the virtual machine cluster; v represents total numbers of the virtual machines in each of the physical machines respectively; $VM_{jiRate}$ represents the resource usage rate of i virtual machine in j physical machine to act as said resource usage weight of the respective virtual machine; $VM_{jiCPUuse}$ represents a load rate of the processor of i virtual machine in j physical machine; $VM_{jiRAMallocate}$ represents an allocated memory of i virtual machine in j physical machine; $HOST_{jRate}$ represents the resource usage rate of j physical machine to act as said resource usage weight of the respective physical machine; $\alpha$ represents the average resource usage rate of the physical machines to act as said average resource usage weight of the physical machines.

4. The method of dynamic resource allocation as defined in claim 1, wherein said default migration value is determined by users.

\* \* \* \* \*